INVENTOR.
Robert S. Root
BY Bodell & Thompson
Attorneys

Patented Feb. 7, 1950

2,496,411

UNITED STATES PATENT OFFICE 2,496,411

DUAL LEVER FRICTION CLUTCH

Robert S. Root, Syracuse, N. Y., assignor to Lipe-Rollway Corporation, Syracuse, N. Y., a corporation of New York Application June 18, 1947, Serial No. 755,442

5 Claims. (Cl. 192—99)

This invention relates to friction clutches, such as automotive clutches of the type including driving and driven members, a pressure ring, spring loaded lever mechanism acting on the pressure ring to engage the clutch with clutch engaging springs acting in opposite directions directly against the pressure ring and through the clutch engaging lever mechanism.

It has for its object a clutch operating lever mechanism including a throw-out lever element of a greater leverage ratio than the spring loaded clutch engaging lever element or unit compactly combined or assembled with the clutch engaging lever unit, whereby considerable less effort is required by the operator to disengage the clutch against the spring mechanism than is applied by the springs to the pressure ring directly against the same and through the clutch engaging leverage.

The invention consists in the novel features and in the combinations and constructions hereinafter set forth and claimed.

In describing this invention, reference is had to the accompanying drawings in which like characters designate corresponding parts in all the views.

Figure 3 is a fragmentary plan view of the clutch engaging lever and toggle unit and the throw-out lever.

Figure 4 is a fragmentary elevation looking upwardly in Figure 3.

Figure 1:
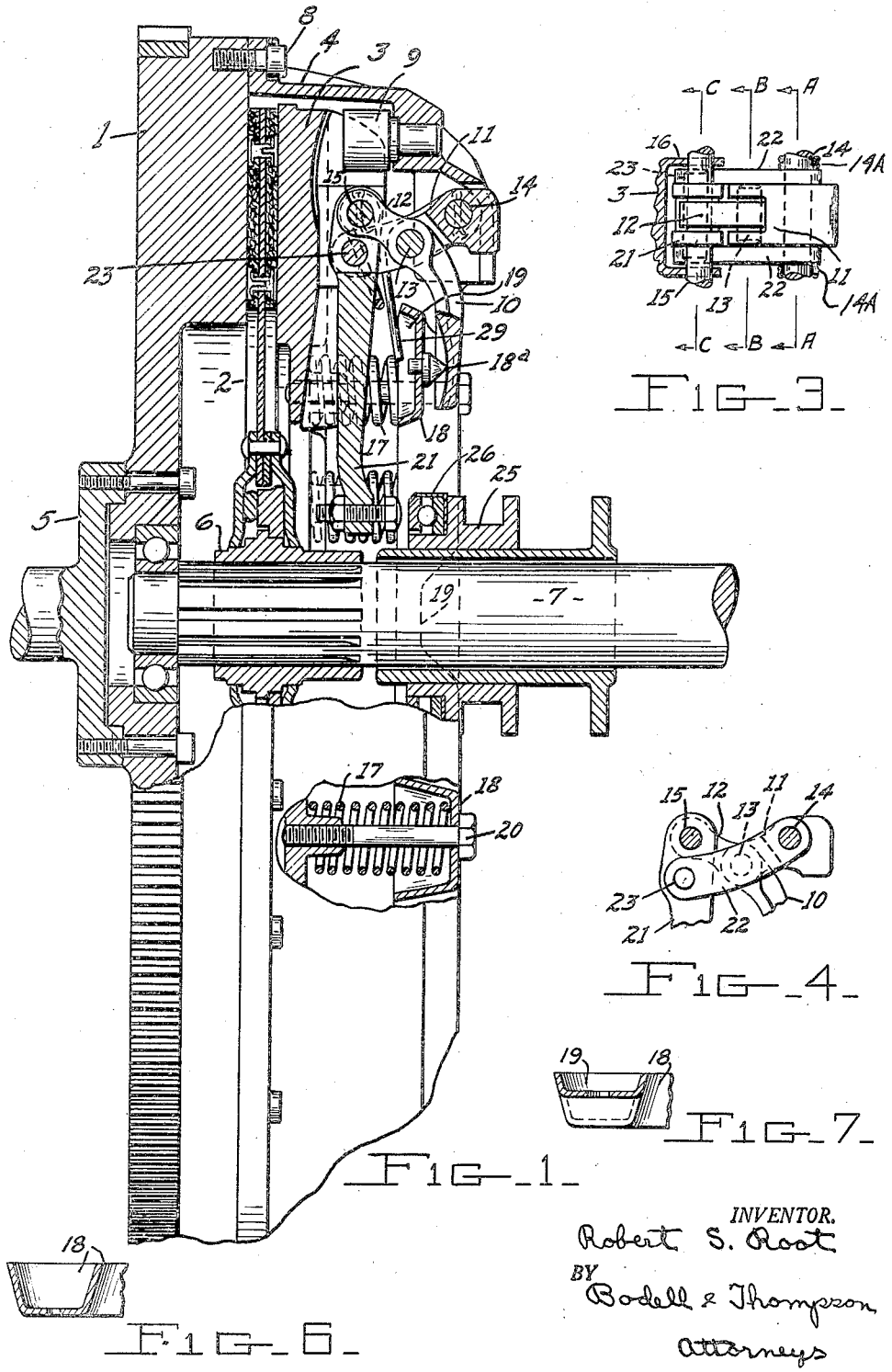
Figure 1 is a longitudinal diametrical sectional view, partly in elevation, of a clutch embodying this clutch mechanism.
Figure 2:
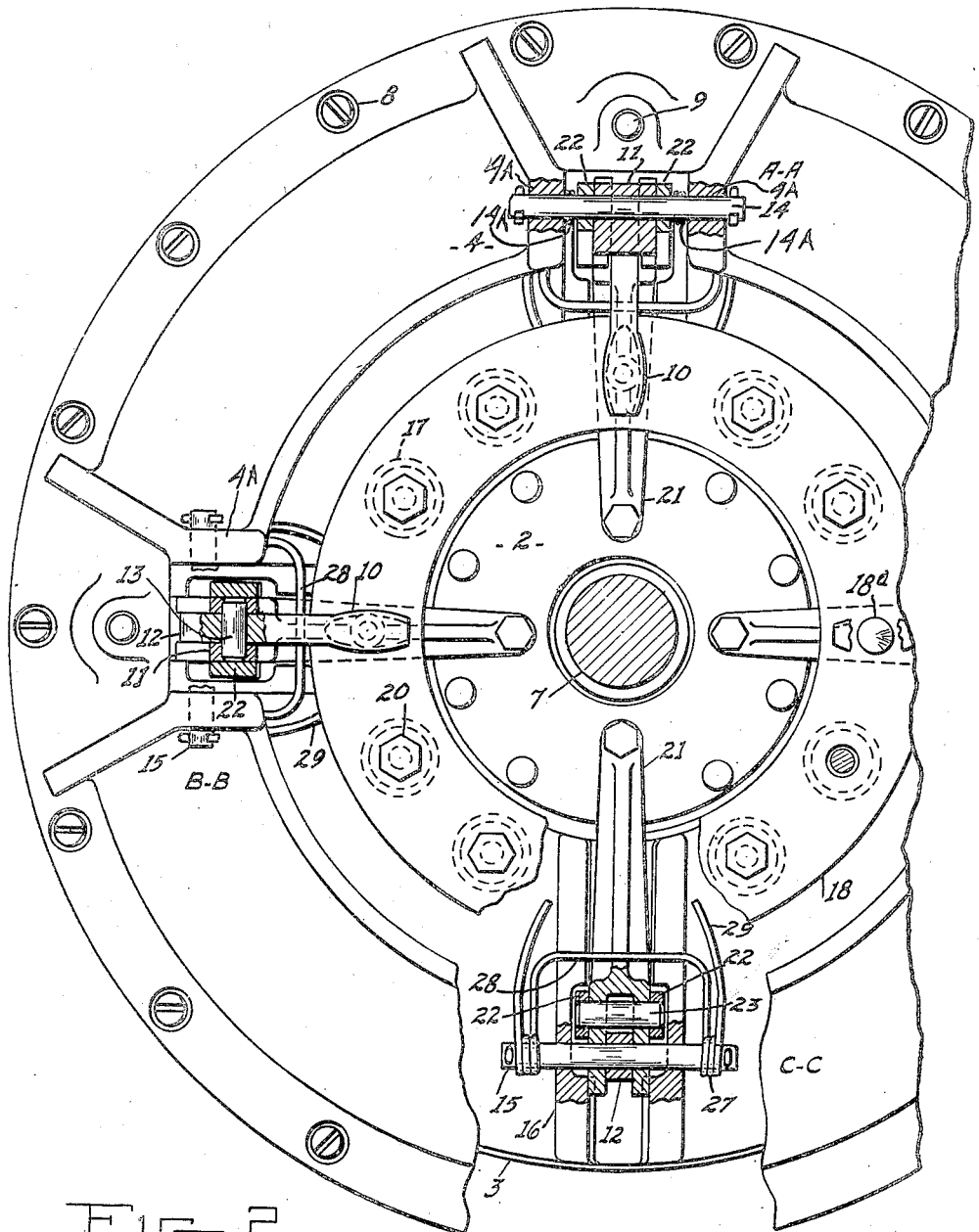
Figure 2 is a fragmentary rear elevation of parts seen in Figure 1, and partly in section, the sectioned parts being taken respectively on lines A—A, B—B and C—C, Figure 3.
Figure 5:
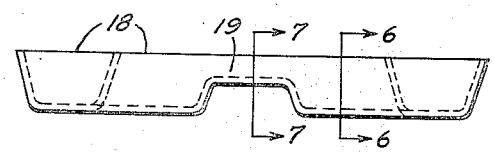
Figure 5 is an edge view of the abutment ring for the clutch springs.

Figures 6 and 7 are sectional views on line 6—6 and 7—7, Figure 5.

The clutch here illustrated includes a driving member 1, a driven member 2, a pressure plate or ring 3, and a back plate 4. The driving member 1 may be the engine fly wheel mounted on a drive or engine shaft 5. The driven member 2 is a friction plate having a hub 6 slidably splined on the clutch shaft 7. It extends between the pressure ring and the pressure face of the driving member 1. The back plate 4 is mounted in the usual manner to the rear face of the driving member or fly wheel 1 and secured thereto as by screws 8. It is here shown as annular and of a hood-shape in cross section. The pressure ring 3 rotates with the driving member 1 and the back plate 4, and is connected to the back plate by driving lugs 9.

There is a plurality of clutch engaging units or assemblies and each unit, in the illustrated embodiment of the invention, includes a multiplying and transmitting lever 10 extending radially relatively to the axis of the clutch, a toggle mechanism including links 11 and 12 pivoted together at like ends at 13 and at their other ends at 14 and 15 respectively to the back plate and to rearwardly extending lugs 16 on the pressure ring 3, the toggle link 12 being an extension of the lever 10 and hence, the pivot or joint 13 of the toggle is the fulcrum for the lever. Washers or shims 14A, in the form of coiled springs, are located on each pivot 14 between the outer ends of the fulcrum links 22 and the projections or lugs 4A on the cover or back plate 4, hold the links 11 and 22 from looseness.

The clutch engaging spring mechanism includes an annular series of compression springs 17 located between the levers 10 and thrusting at like ends against the pressure ring 3 and at their other ends against an annular abutment ring 18 which thrusts through projections 18ª, here shown as conical, against the inner ends of the levers 10. The abutment ring 18 is channel shaped in cross section, and the outer ends of the spring are seated in the channel. The portions 19 of the channel formation, passing to the inside of the inner arms of the levers 10 is shallower than the remainder of the ring. The abutment ring is initially assembled to the pressure ring by suitable means as screw bolts 20 extending through the abutment ring and threading into the pressure ring coaxially of the springs 17. The screw bolts 20 temporarily hold the springs 17 from reacting on the levers while the clutch is being installed, and are removed when the clutch is installed. The link 11 of each toggle is shown as bifurcated, Figure 3, and the bifurcations extend astride the link 12 which is the short arm of the lever 10.

The throw-out levers 21 extend radially and are pivoted at their outer ends on the pivot 15, it being bifurcated and extending astride the link or arm 12 of the lever 10. The springs 17 thrusting against the pressure ring 3 in one direction, and the levers 10 in the opposite direction, tend to straighten the folded toggle links 11, 12, toward the dead center line of the toggle passing through the pivots 14, 15, and hold the clutch engaged, and to automatically take up wear at the friction faces of the clutch without lessening the total pressure of the pressure plate and the friction faces of the clutch. Each throw-out lever 21 is fulcrumed on means projecting from the back plate toward the pressure ring, this means being here shown as links 22 arranged on opposite sides of the toggle links 11 and 12, the links 22 being mounted at their outer ends on the pivot 14, and at 23 to the throw-out levers 21. As the inward radially extending arms of the throw-out levers are considerably longer than the inwardly extending arms of the lever 10, the throw-out levers act at a higher ratio so that the throw-out pressure applied by the operator to the clutch pedal is considerably less than the clutch engaging pressure of the springs 17 directly against the pressure ring and the clutch engaging levers 10. This results in a high pressure clutch that easily disengages against the extremely high clutch spring engaging pressure.

The inner ends of the levers coact with the throw-out collar 25 slidable axially of the clutch shaft 7 and operated in any well known manner. In order to normally hold the throw-out levers 21 off the throw-out collar 25, or the antifriction thrust bearing 26 thereof, each lever is braced by a spring 27 which also holds the lever 21 from rattling. Each is shown as coiled around the opposite end portions of the pivot 15 and having a yoke portion 28 between the coils bearing on the outer or rear sides of the throw-out levers, and an end portion 29 which bears against the inner side of the abutment ring 18.

The arrangement, or assembly, of the clutch engaging levers and toggles and of the throw-out levers and the fulcrum supports, results in a simple, compact, clutch engaging and throw-out mechanism.

What I claim is:

1. A clutch mechanism for clutches of the type embodying driving and driven members, a pressure ring rotatable with the driving member and a back plate, said mechanism comprising lever means having short and long arms, the short arms being pivoted to the pressure ring, fulcrum means for the lever means between the same and the back plate, clutch engaging spring means thrusting in opposite directions against the pressure ring and the long arms of said lever means, and throw-out levers of a greater ratio than that of the clutch engaging lever means pivoted to the pressure ring, and fulcrum means therefor between the back plate and the throw-out levers.

2. A clutch mechanism for clutches of the type embodying driving and driven members, a pressure ring rotatable with the driving member and a back plate, said mechanism comprising lever means having short and long arms, the short arms being pivoted to the pressure ring, fulcrum means for the lever means between the same and the back plate, clutch engaging spring means thrusting in opposite directions against the pressure ring and the long arms of said lever means, and throw-out levers of a greater ratio than that of the clutch engaging lever means pivoted to the pressure ring, and fulcrum means therefor between the back plate and the throw-out levers, the throw-out levers extending between the clutch engaging lever means and the pressure ring.

3. A clutch mechanism for clutches of the type embodying driving and driven members, a pressure ring rotatable with the driving member, and a back plate, said mechanism comprising toggle links pivoted respectively to the pressure ring and to the back plate and to each other, and a lever pivoted on the joint of the toggle, one arm of the lever being the link of the toggle pivoted to the pressure ring, spring means thrusting in opposite directions against the pressure ring and the other arm of the lever, and a throw-out lever of greater ratio than the former lever and the toggle links, the throw-out levers being pivoted to the pressure ring on the pivot for the toggle link which is pivoted to the pressure ring, and fulcrum means for the throw-out lever projecting toward the pressure ring from the back plate.

4. A clutch mechanism for clutches of the type embodying driving and driven members, a pressure ring rotatable with the driving member, and a back plate, said mechanism comprising toggle links pivoted respectively to the pressure ring and to the back plate and to each other, and a lever pivoted on the joint of the toggle, one arm of the lever being the link of the toggle pivoted to the pressure ring, spring means thrusting in opposite directions against the pressure ring and the other arm of the lever, and a throw-out lever of greater ratio than the former lever and the toggle links, the throw-out levers being pivoted to the pressure ring on the pivot for the toggle link which is pivoted to the pressure ring, and fulcrum means for the throw-out lever projecting toward the pressure ring from the back plate including a link mounted on the pivot connecting the other link of the toggle to the back plate.

5. A clutch mechanism for clutches of the type embodying driving and driven members, a pressure ring rotatable with the driving member, and a back plate, said mechanism comprising a lever and toggle unit between the back plate and the pressure ring, and spring means acting in opposite directions against the pressure ring and the lever of said unit, fulcrum means carried by the back plate and extending towards the pressure ring and astride the lever and toggle unit, and a throw-out lever of a greater ratio than the lever and toggle unit fulcrumed on the fulcrum means and extending astride of the lever and toggle unit and pivoted to the pressure ring.

ROBERT S. ROOT.

REFERENCES CITED

The following references are of record in the file of this patent:

UNITED STATES PATENTS

| Number | Name | Date |
| --- | --- | --- |
| 2,057,802 | Tatter | Oct. 20, 1936 |
| 2,249,043 | Root | July 15, 1941 |
| 2,259,784 | Spase | Oct. 21, 1941 |
| 2,311,997 | Pearson | Feb. 23, 1943 |
| 2,436,874 | Spase | Mar. 2, 1948 |